United States Patent Office 3,333,516
Patented Aug. 1, 1967

3,333,516
BOX FORMING MACHINE, PARTICULARLY
FOR SHOE BOXES
Thomas L. Waterworth, Sr., and Thomas L. Waterworth, Jr., Dracut, Mass., assignors to Millen Industries, Inc., New York, N.Y., a corporation of Delaware
Filed Jan. 15, 1965, Ser. No. 425,817
13 Claims. (Cl. 93—36.3)

ABSTRACT OF THE DISCLOSURE

The invention is specifically directed to an arrangement of components which are fully adjustable so as to effect folding and gluing of shoe boxes over a wide range of sizes.

This invention relates to semi-automatic machines and more particularly to machines of the type wherein the operation progresses from station to station of the machine by manually moving a shoe box blank so that the machine can perform various forming and gluing operations at box ends, and also box covers.

Prior art machines have various drawbacks in that they are complex and have a lack of versatility in the range of boxes and covers which can be handled with any one machine.

The present invention has for one of its purposes the provision of a machine which can be readily adjusted to take and form virtually any size of commercial shoe box and cover from baby size to boot size.

A further object of the machine is to provide a simple arrangement for effecting proper adjustment of a number of components for different sizes of boxes of conventional type, having side flaps, side end flaps and end flaps with tuck-in flaps foldably joined to the end flaps.

A still further objection of the invention is to provide a machine having a novel glue roller arrangement wherein the rollers are readily adjusted so as to function properly in coating box flaps and wherein the construction is such as to achieve convenient cleaning of the rollers and the glue pan.

Yet another object of the invention is to provide a machine in which contiguous box flap surfaces intended to adhere to each other are firmly and rapidly pressed together by power means.

Other objects and features of the invention will be apparent from the description to follow:

Briefly, the invention comprises a machine construction having a suitable support table of any conventional arrangement which is relatively fixed and on which table there is a slidably mounted plate on which is secured many of the components of the machine, such components being simultaneously adjustable by sliding of the plate for operation on various box widths. All of these components are movable so as to vary the distance from a final folding element and a pneumatically operated ram and anvil arrangement fixed to the table and which perform the final operations. The machine is also equipped with a horizontal guide shelf along which box blanks are slid in the course of folding operations, the height of such shelf being adjustable to coact with a vertical guide fence for different box depths.

Detailed description of the invention now follows in conjunction with the appending drawing, in which:

FIGURE 1b is a fragmentary plan view of a cover blank for the box of FIGURE 1a.

Figure 1:
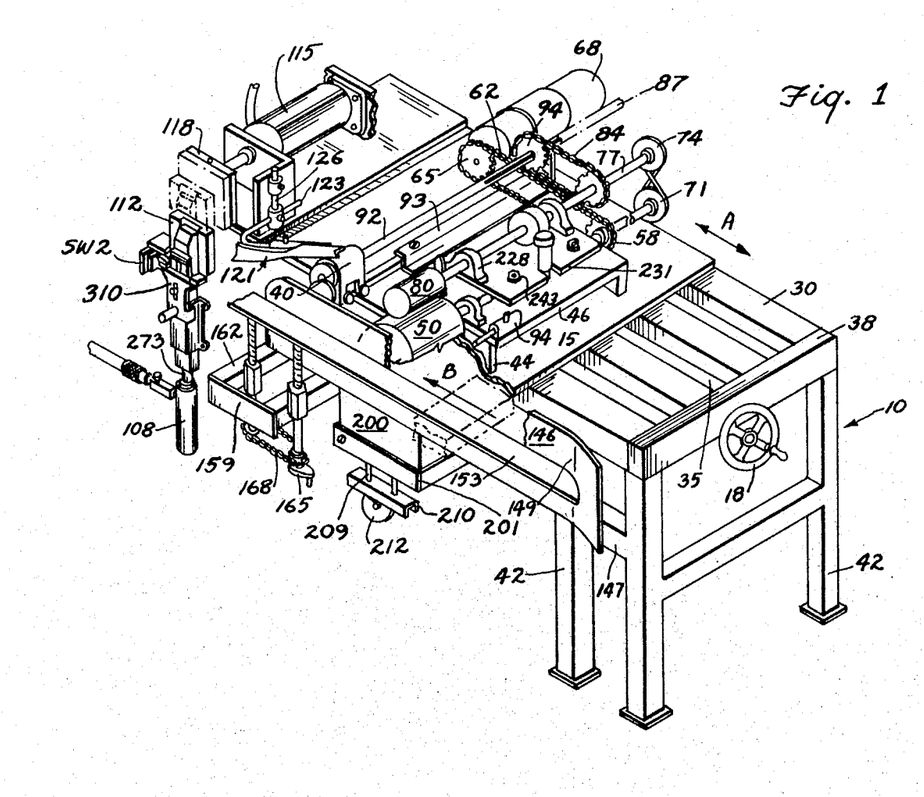
FIGURE 1 is a perspective showing the main components of the machine, various conventional constructional details being omitted for clarity.
Figure 2:
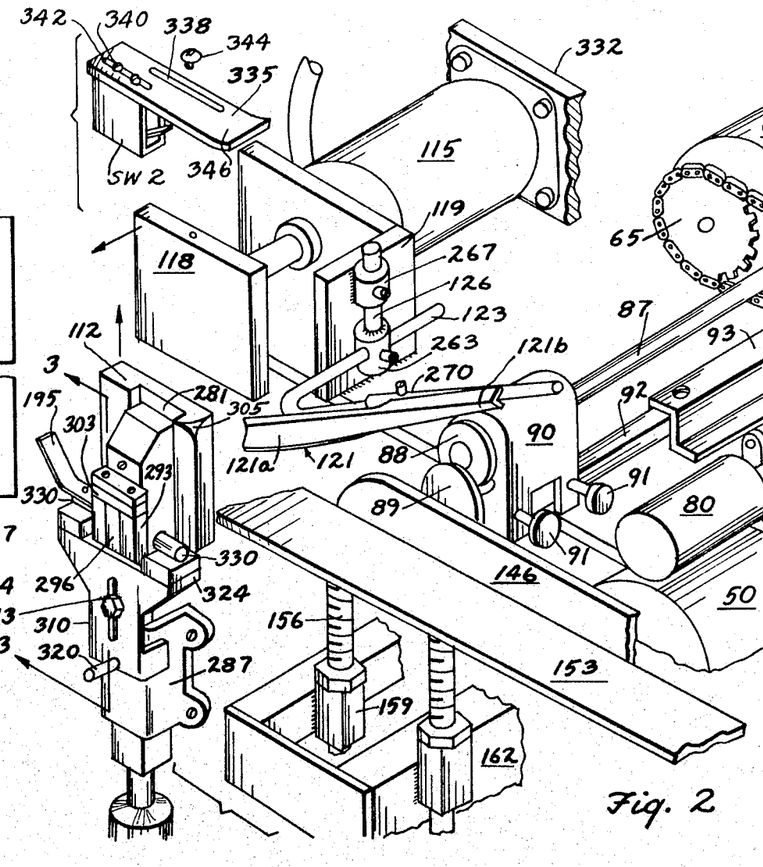
FIGURE 2 is an enlarged perspective of a portion of FIGURE 1.
Figures 9, 9A:
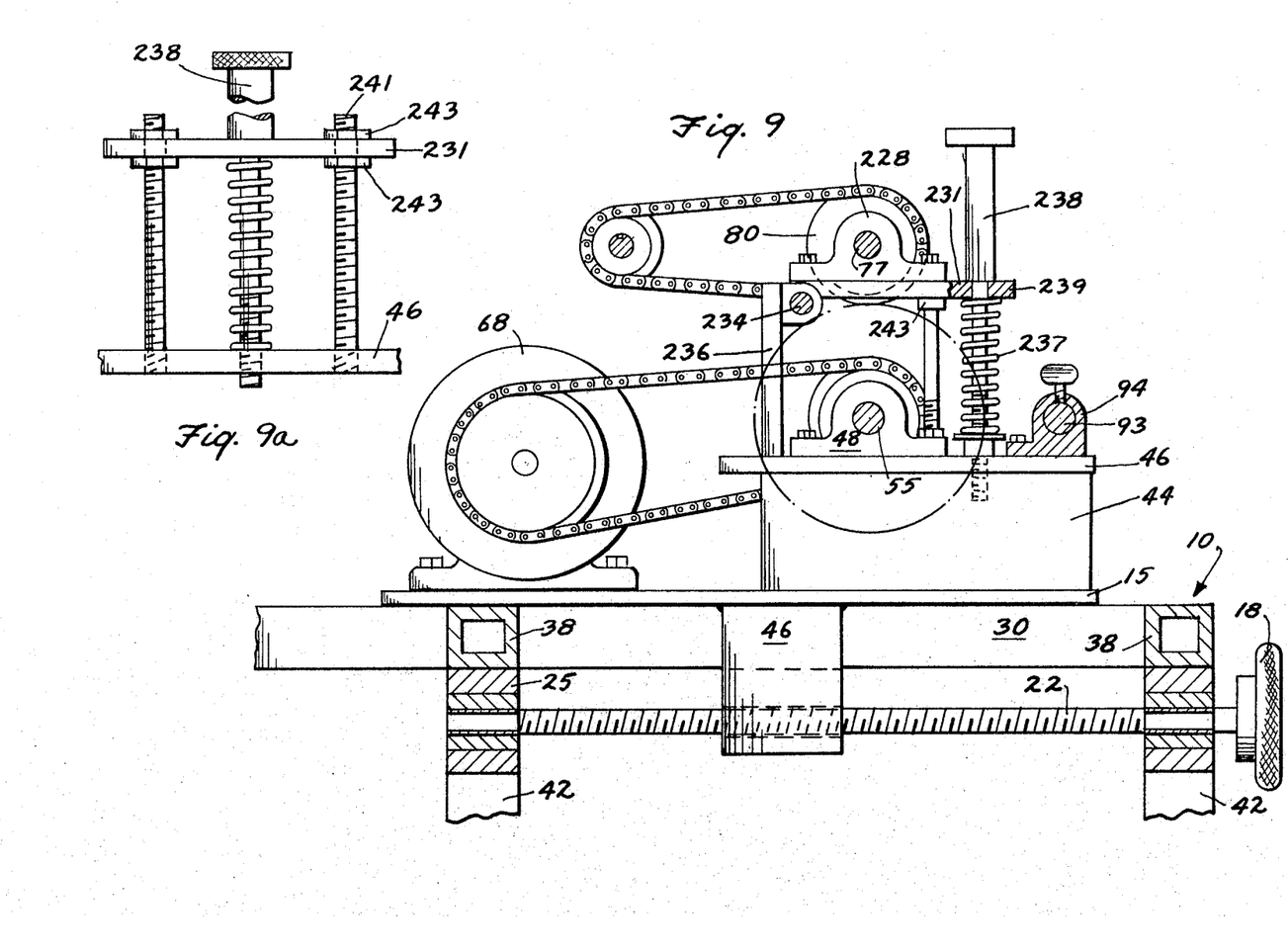
FIGURE 9 is a cross sectional elevation of another portion of the glue coating device showing the pressure roll adjusting means taken on 9—9 of FIG. 5, to an enlarged scale.
FIGURE 9a shows a detail of the adjusting means of FIGURE 9.

Referring to the drawing and, particularly, FIGURES 1 and 2, the machine comprises a support table 10 which may be of any conventional construction and on which a main support plate 15 is slidably carried so as to be reciprocably movable as indicated by the arrow A (FIG. 1) by means of a hand wheel 18 which rotates a lead screw 22 (FIG. 9) supported in cross bars such as 25 and 28 in any suitable manner. The adjusted position of plate 15 depends on the width of boxes or covers to be folded, relative to a final folding element and pressure elements at a downstream end of table 10, box movement being in the direction of arrow B (FIG. 1). Table 10 may be comprised of a plurality of bars having square cross section and welded together as will be readily understood by persons skilled in the art. For example, such table may have longitudinal horizontal bars 30 which are spaced to effect slots 35, the ends of bars 30 being welded to cross bars such as 38, and legs 42 being welded to the corner junctions of the bars and elsewhere intermediate the tables ends. The center slot 35 acts as a guide for a guide block 46 welded to plate 15 and having threaded connection with lead screw 22 so that as the hand wheel is rotated the support plate 15 is shifted.

Carried on the support plate 15 are plates such as 44 (FIG. 9) which support a bridge plate 46 having bearing blocks 48 for a glue roll 50 secured to shaft 55 carried in the bearing blocks and driven by a sprocket wheel 58 having sprocket chain 62 driven by a drive sprocket wheel 65 rotated by electric motor 68 also carried on plate 15.

Shaft 55 has a pulley 71 reversely belted to a pulley 74 on shaft 77. Shaft 77 carries a pressure roll 80 which coacts with glue roll 50 to press box flaps thereagainst for coating with glue. Shaft 77 is coupled by a sprocket chain 84 to a shaft 87 which rotates a breaker mechanism having spaced discs 88, 89. The breaker mechanism is of generally conventional arrangement and has a housing 90 which supports the discs, which discs will be understood to be conventionally geared to each other within the housing. The action of the discs breaks the score line of the tuck in flap in the usual manner and has conventional adjusting means such as knobs 91 for adjusting axial spacing of the discs to take care of different box and cover sizes and board thicknesses.

Housing 90 is carried on a bar 92 which is adjustable slidably in a bracket 92a which is carried on plate 15. A set screw can fasten bar 92 and bracket 92a together in any adjusted position, wherein such position may be changed for various depths of end flaps. In order to provide for such axial adjustment of the housing 90, shaft 87 is slotted and slidably keyed to a sprocket 94 on chain 84 as shown in FIG. 1.

Likewise carried on the bridge plate 46 is an adjustable support shaft 93 for a doctor blade 96 (FIGURE 8), the shaft 93 being supported in a bracket 94 (FIGURE 9) secured to plate 46. Blade 96 is held in a slot in a block 100 on shaft 93 and acts in a conventional manner to regulate the glue coating thickness on glue roll 50, being slidably adjustable by a pair of screws 103 acting against springs 104 for that purpose.

At the end of table 10 there is carried a vertical pneumatic cylinder 108 which powers an anvil 112, and a horizontal pneumatic cylinder 115 which powers a ram 118 and adjustably secured on a bracket 119 welded at the end of the table disposed upstream of the ram and anvil is an end flap folding horn 121 which is adjustable as to angle and position by means of bars 123 and 126.

Table 10 has fixed vertical guide plate 146 fixed thereto as on longitudinal bar 147, with a curved portion 149. Horizontal guide shelf 153 is adjustably carried by the table on screws 156 which pass through nuts 159 welded to cross bars 162 and rotative in unison as by crank 165 and sprocket chain 168 to raise and lower horizontal guide shelf 153. Bars 162 may be secured in any suitable manner to one or more bars 30 at a suitable distance therebelow.

The top edge of plate 146 is fixed at the level of the juncture line between rolls 50 and 80, and the adjusted level of shelf 153 is for box or cover depth. The radial face of glue roll 50 is closely adjacent plate 146.

Figure 5:
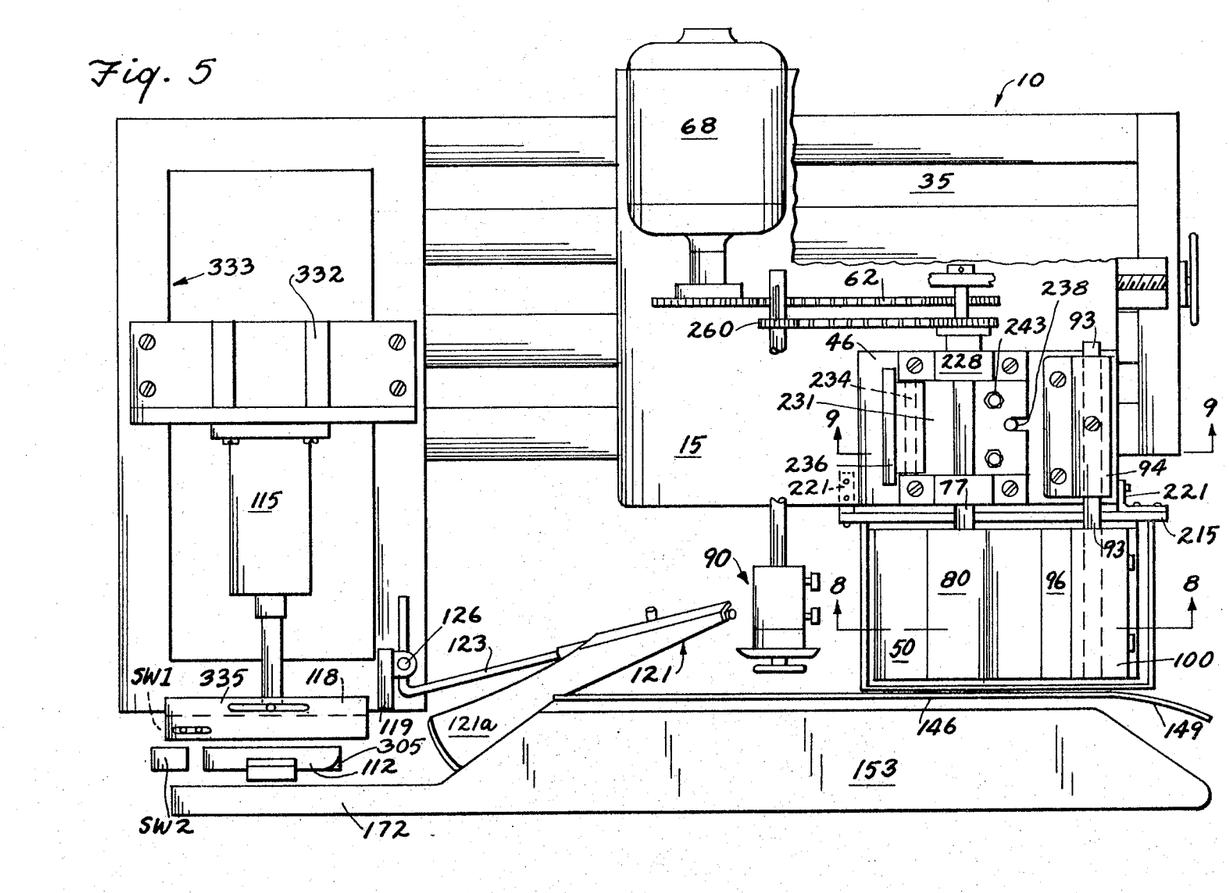
FIGURE 5 is a plan view of the machine showing various basic components, certain components being omitted for clarity.

It will be noted from FIGURES 5 and 6 that the horizontal guide shelf 153 extends substantially to the end of the machine and has a narrowed section 172 which clears the anvil 112 so as to support a box while the anvil is coming up inside of it, the anvil being normally below shelf level and shown in FIGURE 6 as moving upwardly (arrow A) to come up inside a box end shown in phantom.

It will be appreciated that many structural details of the invention have not been described nor shown for the reason that such structural details are a matter of design and are not requisite for a complete understanding of the principles and operation of the machine.

The above description of the components is sufficient for the purpose of gaining an understanding of the operation of the machine and how it is used, details of such components being set aside for the moment.

Figures 1A, 12:
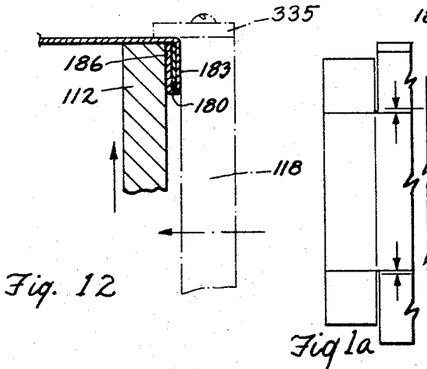
FIGURE 1a is a fragmentary plan view of a box blank of a type folded by the machine.
FIGURE 12 is a cross sectional elevation showing the coacting of the pneumatically operated ram and anvil in pressing glue coated flaps together in the final operation of the machine.
Figure 1B:
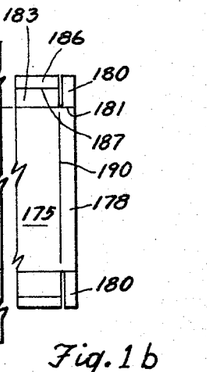

Referring now to FIGURES 1, 1a–1d and 2, it is assumed that a box cover shown in FIGURE 1b is to be formed, the blank for which is of usual construction. Thus, such blank has the top panel member 175, the side panels 178, the end side flaps 180, end flaps 183, and tuck-in flaps 186 joined thereto by score lines 187. The construction is identical for the box itself as shown in FIGURE 1a except, as will be appreciated, the dimensions are somewhat smaller (indicated by arrows for length dimension in FIGURE 1a) so that the cover can telescope on the open top of the box.

Assuming a cover end is to be formed, the horizontal guide shelf 153 is set with respect to the top edge of the vertical guide plate 146 so that the end flap 183 rests on that edge depending on cover depth, and in the plane of tangency between rolls 50 and 80.

Figures 1C, 1D, 10, 11:
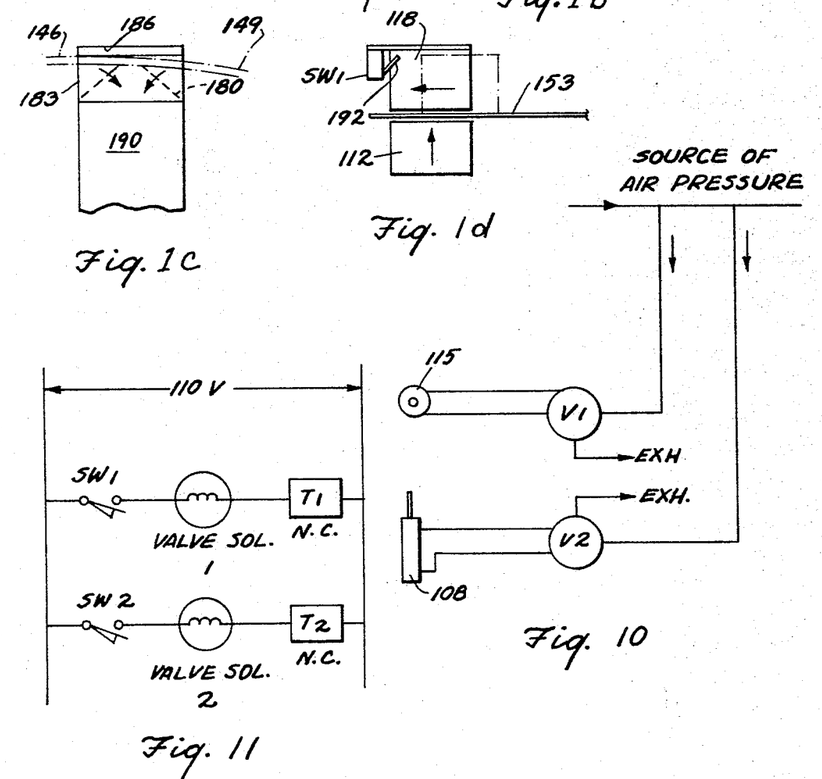
FIGURE 1c shows a step in the folding operation.
FIGURE 1d is a diagrammatic illustration of the movement of the folded blank toward a switch which controls air pressure to an upwardly rising anvil, one of the pneumatically powered elements.
FIGURE 10 is a diagram of the pneumatic circuitry of the machine.
FIGURE 11 is a schematic diagram of the electric circuitry of the machine.

The initial use of the invention follows along generally conventional lines in that the score lines 190 (one shown) are manually broken on each side of the panel 175 and thus the side panels 178 are folded down in vertical planes so that the lower edges rest on shelf 153 and support the cover for sliding thereon. As shown in FIGURE 1c, a cover end is pushed against the curved portion 149 of the vertical guide plate 146 in the usual manner so that the end side flaps 180 are pressed inwardly in the direction of the arrows (FIG. 1c) on score lines 181.

The cover is then slid on shelf 153, flap 183 resting on the edge of plate 146, and flaps 183 and 186 then pass between rolls 50 and 80 and are glue coated in the usual manner. The breaker mechanism 90 with the end flap 183 extending outwardly, the breaker discs then being in position so that the tuck-in flap 186 rides between the discs in a well known manner and the score line 187 is broken.

The cover is then continued in its sliding movement on shelf 153 until the end flap 183 comes into abutment with the folding horn 121. Such folding horn has a scoop-like compound curve surface 121a extending downstream rearwardly from a formation having right angle cross section 121b as illustrated in FIGURE 2.

Figure 6:
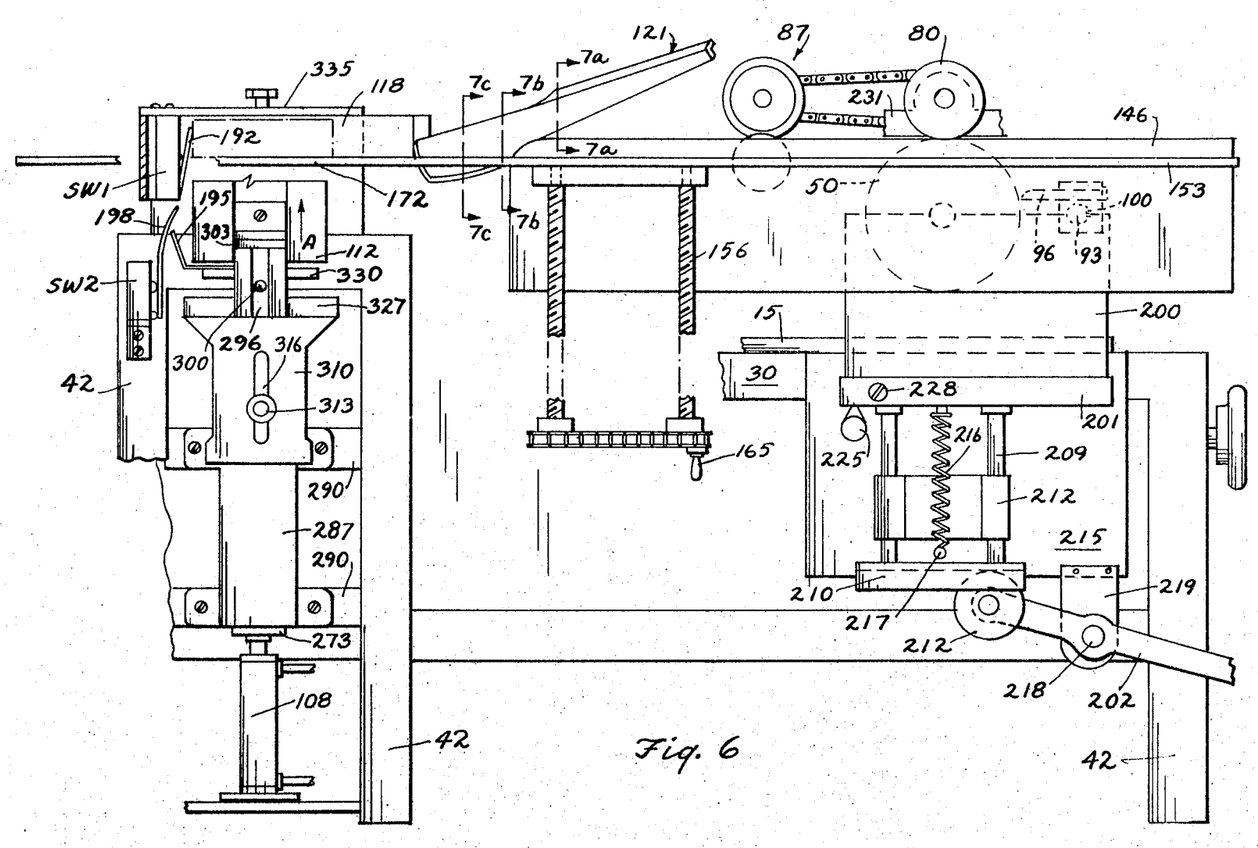
FIGURE 6 is an elevation of the machine showing certain basic components, other components being omitted for clarity.
Figures 7A, 7B:
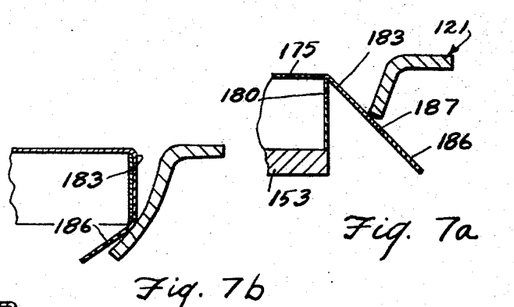
FIGURES 7a, 7b, 7c are cross sections at various respective planes, 7a—7a, 7b—7b, 7c—7c of FIGURE 6, to an enlarged scale.
Figure 7C:
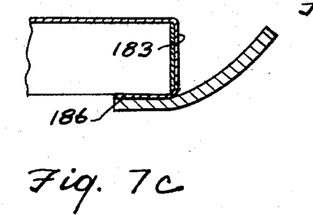

At about the plane 7a—7a of FIGURE 6, the tuck in flap 186 comes into engagement with the folding horn edge (FIGURE 7a) which has the effect of bending flap 183 downwardly. Continued movement of the cover causes progressively greater folding in of flap 183, thus as shown in FIGURE 7b the general condition produced at plane 7b—7b of FIGURE 6 is illustrated, and finally at approximately the end of the folding horn the general condition produced at plane 7c—7c of FIGURE 6 is illustrated in FIGURE 7c.

Thereafter the cover is moved along the shelf 153, as shown in phantom line in FIGURE 1d, moving in the direction of the horizontal arrow to engage the lever 192 of a switch SW1. This controls the pneumatic cylinder 108 which has the effect of causing the anvil 112 to move upwardly inside the cover end to the position shown in FIGURE 12. As the anvil moves upwardly, a finger 195 (FIGURE 6) carried by the anvil structure engages the lever 198 of a switch, SW2, which has the effect of providing pressure for the ram cylinder 115 and thus the ram 118 moves forwardly to the phantom position shown in FIGURE 12 to squeeze the tuck in flap 186 and end flap 183 tightly against the side end flaps 180 causing firm adherence.

The work is then removed and the same sequence gone through, starting at the curved portion 149 of the guide plate 146 for folding the other end.

Details of the machine will now be described as to certain major components.

Figure 8:
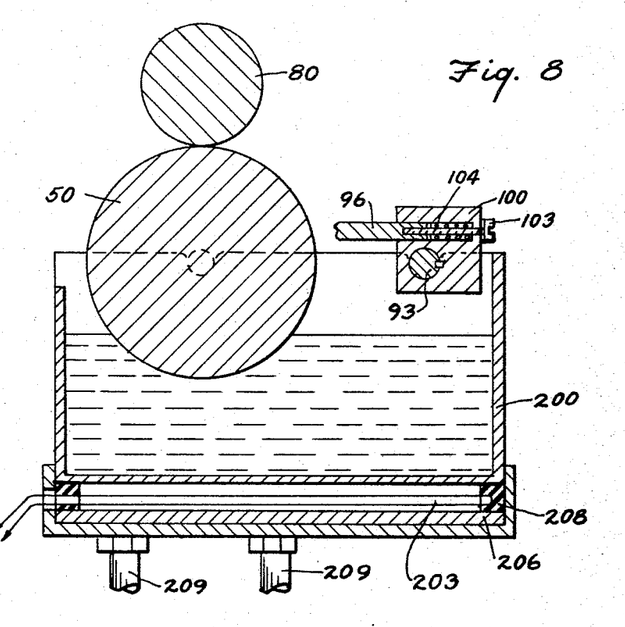
FIGURE 8 is an elevational cross section on 8—8 of FIGURE 5 showing the glue coating device to an enlarged scale.

*The glue coating mechanism.*—The gluing mechanism has a pan 200 for holding liquid glue and with reference to FIGURE 8 it will be seen to rest in a heater and support tray 201 which can be raised or lowered by lever 202, shown in FIGURE 6. A rectangular heater element 203 is carried in the tray on an asbestos pad 206 and will be understood to be suitably wired to a source of electricity. Such heater element may be in the form of a grid of resistance wire supported in a ceramic frame 208, the details of which will be apparent to persons skilled in the art. Connections thereto may be made in any suitable manner and if desired a thermostat may be incorporated therewith for providing a uniform temperature. The pan side is notched at its upper edge to accommodate the support rod 93 for the doctor blade 96 and also for the shaft 55 which carries glue roll 50. The pan can be raised and lowered on rods 209 which are suitably secured to the tray 201 and fastened at their lower ends to an inverted channel 210 (FIGURES 1 and 6). The rods 209 pass slidably through a vertically supported bracket 212 secured in any suitable manner to a plate 215. A spring 216 exerts tension between plate 215 at pin 217 fastened thereto and the bottom of the tray so as to bias channel 210 against a roller 212 carried at the end of lever 202. Lever 202 is pivoted on pin 218 an extension 219 of plate 215. Plate 215 is carried slidably with the plate 15, FIGURE 6, and may be fastened thereto by angles 221. The roller 212 rolls against the bottom of channel 210 between the flanges as the lever swings around its pivot pin. A suitable lock 225 may be utilized to fasten the raised tray and pan in position after it has been lifted by the lever. Lock 225 may be a very simple construction, for example, an eccentric knob than can be pushed into a bore of plate 215 so that it can be rotated to bring the high side against the tray. Upon removal of the knob, the tray can be lowered by the lever to lower the glue pan whence the glue pan can be removed from below the vertical plate 146. The lever has sufficient weight beyond the pivot point to maintain the glue pan in place until the lever handle is swung counter-clockwise to lower the tray. Any suitable type of set screw such as 228 may be threaded through the tray in order to lock the pan therein, or other suitable locking means may be used.

From the construction described, it will be apparent that the glue pan may be readily removed for cleaning and this will provide access to roll 50 for cleaning. Also removal of the pan permits convenient maintenance for the heater element in the tray. Such heater arrangement may be of any commercial type readily removable as a unit, for example, as used in flat irons and toasters.

*The pressure roll adjustment.*—The pressure roll 80 (FIGURES 5, 9, 9a), carried on shaft 77, is adjustable with respect to roll 50. Thus shaft 77 is carried in bearing blocks 228 secured to a pivotal plate 231. The plate 231 is pivoted on a shaft 234 to a vertical support plate 235 fastened to plate 46. Plate 231 can be raised by spring 237 and lowered by a screw 238 having a lower end which will be understood to be threaded into plate 46. The spring is concentric with screw 238, and the screw fits in a slot and bridges the slot to engage plate 231. Plate 231 is provided with locking screws 241 (FIGURE 9a) on each side of screw 238. Thus roll 80 can be raised and lowered relative to the surface of roll 50 by rotation of screw 238. The locking screws are threaded into plate 46 and have nuts 243 on each side of plate 231. By the arrangement described, very accurate adjustment for different box board thicknesses can be achieved and maintained. Locking screws 241 pass through plate 231 with sufficient play to permit pivotal action of the plate.

*The folding horn.*—The folding horn is best illustrated in FIGURE 2 and will be seen to comprise a metallic element which may be bent of suitable sheet metal with a generally right angle cross-section at its upstream end 121a which merges into a compound curve section 121b at its downstream end. Thus a box flap would first engage the right angle section, at some portion thereof and be gradually folded downward as it emerges from the curved downstream portion, as hereinbefore described in connection with FIGS. 7a, 7b, and 7c. The horn is completely adjustable by being carried on bent rod 123 which can move horizontally in collar 263 and which collar in turn is carried by rod 126 which can move vertically in collar 267, the latter collar being fixed to bracket 119. Rods 123 and 126 can be held in adjusted position by the set screws shown. Further, the horn is carried on a collar 270 which is slidable and rotative on the bent end of rod 123 and can be secured thereto by the set screw shown. It will be apparent that horn 121 can thus be moved to virtually any position for coaction with box flaps moving thereagainst. This considerable adjustability has utility not only in adjusting dimension of box flaps but also for board thickness. The angle 272 of bend of rod 123 is about 50°–80° so that the horn is in a skew position relative to plate 146.

*The anvil and ram final pressure device.*—The anvil 112 (FIGURES 2–6) is carried on a plunger 273 fastened to piston rod 275 of cylinder 108. The anvil is provided with a rabbet 281 into which the flat face of the plunger fits for a secure holding and a screw 284 fastens the two elements together. Different sizes of anvils are used for various box and cover sizes. The plunger 273 slides in a fixed bracket 287, fastened to bars 290 (FIGURE 6) in turn suitably secured to structural members of the table 10 in a manner which will be readily understood by persons skilled in the art. An upwardly extending tongue 293 of bracket 287 is provided with a slot 296 into which protrudes a pin 300 (FIGURE 3) the inner end of which is fastened in the plunger 273. The slot 296 is closed at its top with a rubber block 303 secured in place by cross plates 306 between which is carried the switch tripping finger 195. Plates 306 are screwed across the top of slot 296.

Movement of the plunger 273 and the anvil 212 in an upward direction is limited by abutment of pin 300 with rubber block 303 and such limited movement is fixed and non-adjustable since block 303 is secured to fixed bracket 287.

It will be noted that the anvil has a rounded corner 305 which effects a relieved curvature as seen in FIG. 2.

The downward position of the ram brings the top edge of the ram about at a level with the bottom surface of shelf extension 172. Therefore, as will be understood from FIG. 5, when the box cover leaves horn end 121a it is slid on the extension 172 towards the ram, but the tuck-in flap 186 tends to flex downwardly away from the position shown in FIG. 7c at its leading edge, although horn portion 121a tends to keep the trailing edge in the position of FIG. 7c. It is the leading edge which engages relieved corner 305 to ensure against snagging as the box cover is moved over the anvil into engagement with switch SW1 (FIG. 1d). The rising anvil tucks the tuck-in flap into the box end before ram pressure is applied. Were the edge 305 of the anvil to remain squared, it would tend to catch the leading edge of the tuck-in flap, and thus manual manipulation would be required to avoid such condition.

Figures 3, 4:
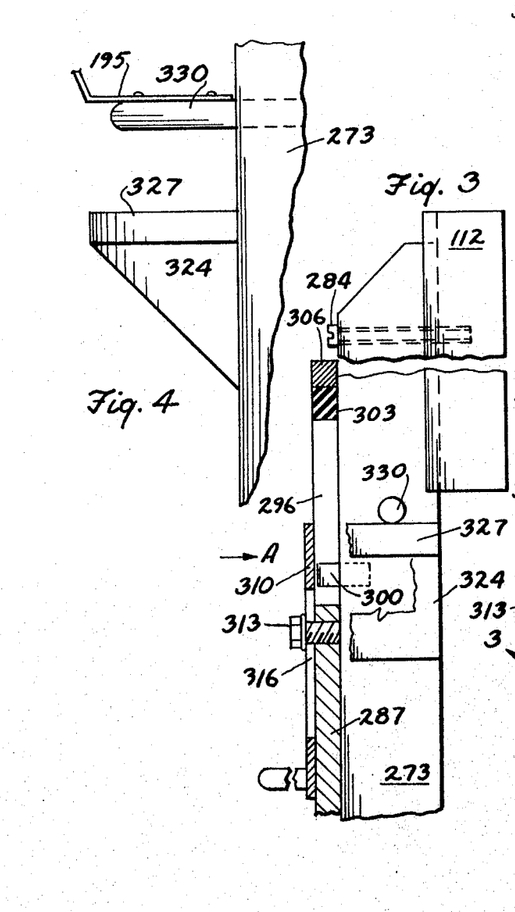
FIGURE 3 is a partial section taken on 3—3 of FIGURE 2.
FIGURE 4 is a fragmentary elevation in the direction of arrow A of FIGURE 3.

Downward movement of the anvil is made adjustable to compensate for different depths of boxes and covers, and this is achieved by an adjustably slidable bracket 310 which can be secured at fixed positions on bracket 287 by means of a screw 313 which can be tightened in the front face of bracket 287 and which extends through a slot 316 in the slide bracket 310. Accordingly, the slide bracket can be moved by a handle 320 to various elevations, depending on the elevation of slot 316 and secured in place relative to the machine frame. The bracket 310 carries triangular support pieces 324 secured thereto which support respective rubber blocks 327 engageable by downward movement of respective pins 330 carried by plunger 273. Thus, to adjust the anvil for a particular depth of box, the bracket 310 is moved upwardly or downwardly so that pins 330 resting on blocks 327 will put the top edge of the anvil flush with the surface of shelf 153. One pin 330 carries finger 195 (FIG. 4).

The ram 118 is carried on the piston rod of cylinder 115 which is carried on a bracket 332 fastened to a horizontal frame 333 at the end of tablet 10. Ram 118 has an adjustable hood plate 335 at its top edge. The hood plate carries switch SW1 and is slotted at 338 so as to be secured to the ram at different positions to locate switch SW1 (FIGURE 6) in order for the switch lever 192 to be properly placed for abutment by boxes and covers of differing widths. The plate 335 also serves the purpose of holding the box or cover end down on the anvil (FIGURE 12) as the ram moves against it in applying pressure. Switch SW2 is adjustable by means of screws 340 and slot 342, and plate 335 is fastened in adjusted position to the ram by screw 344. Plate 335 is bent upwardly at corner 346 so that boxes can readily slide below the front edge of the plate.

The control system for the cylinders 108 and 115 is of an elementary nature and schematically illustrated in FIGURES 10 and 11. Thus, four-way valves V1 and V2 are shown for controlling compressed air from a source of pressure to the cylinders, and it will be understood that these are conventional solenoid valves, the solenoids of which are symbolically shown in FIGURE 11, and are energizable from any suitable current source such as the 110 volt lines shown. The solenoid for V1 is in series with the switch SW1, a normally open switch, and also in series with a time delay relay T1 which is a normally closed switch. Thus, when the downstream side of a box or cover moves against the lever 192 (FIGS. 1d, 2, and 6) approximately a half second delay is permitted in order to fully dispose the work in position over the ram 112 so that it will be properly set for the ram to come up inside of it. As the anvil 112 comes up, the finger 195 on the ram (FIG. 6) moves lever 198 so that switch SW2 is closed with time delay afforded by relay T2. Accordingly, the ram starts to move, and by the time the anvil has reached the upper limit of its position as determined by pin 300 engaging rubber block 303 (FIG. 3), the ram is substantially in contact with the end of the box or the cover and is beginning to apply suitably heavy pressure to make sure that the various flaps adhere to each other. As heretofore explained, the plate 335 moves over the top panel to ensure the box or cover end remaining in place on the anvil; otherwise, there may be a tendency for it to be forced upwardly as the ram applies pressure.

It will be apparent from the above description that the machine is adjustable for a wide variety of box and cover dimensions. Thus, by way of summation, the plate 15 is adjusted for end flap width by the hand wheel 18 to vary the horizontal spacing between the breaker housing 90 and the folding horn 121 so as to ensure full movement of the work away from the breaker device before engaging the folding horn. Housing 90 is adjusted for end flap depth and the breaker discs are adjusted for tuck-in flap depth. Further, the shelf 153 is raised or lowered by crank 165, depending on depth of the work so that end flaps will be guided on the fixed top edge of plate 146 and remain horizontally in the plane of tangency of rolls 50 and 80. The folding horn 121 has a variety of adjustments. Thus, the angle of the flat upstream face 121a (FIG. 2) is variable around the axis of the end portion of rod 123 by virtue of collar 270. The angle of the entire horn with respect to shelf 153 is variable by virtue of collar 263 and the height of the horn as well as its skew angle with respect to the plane of plate 146 is variable by virtue of collar 267. An operator might make several adjustments in order to position the horn to meet any condition of box flap size and board thickness. Finally, by means of the screw 313, the depth to which the anvil 122 will descend in rest position is set so that a box or cover will slide over it on the narrowed portion 172 (FIG. 5) for the final pressure operation.

Having thus described the invention, we are aware that various changes may be made without departing from the spirit thereof and, accordingly, do not seek to be limited to the precise illustration herein given except as set forth in the appended claims.

We claim:

1. A machine for folding the ends of boxes of the type having a main panel, side panels foldably secured to respective sides of said main panel, side end flaps foldably secured to respective side panels, end flaps foldably secured to respective ends of said main panel, and tuck-in flaps foldably secured to respective end flaps; which machine comprises a support frame structure having a movable member, a glue coating device and a score line breaker device carried on said movable member, said frame structure having a guide shelf extending past said devices and on which a box can be manually slid on the edges of folded down side panels for glue coating of end and tuck-in flaps and the breaking of score lines between end and tuck-in flaps; a fixed guide plate having a guide edge adjacent said guide shelf and disposed adjacent said glue coating and score line breaking devices, said guide shelf being adjustable relative to said guide edge of said guide plate to correspond to box depth; said frame structure carrying a folding horn downstream of said devices, said devices being spaceable from said folding horn by adjustable movement of said member to compensate for box width and said folding horn being engageable by end flaps for folding the same as said box is moved therepast, an anvil movable perpendicularly to said guide shelf and being located downstream of said folding horn and initially disposable substantially out of the path of boxes on said guide whereby a box end can be moved over said anvil after leaving said folding horn and said anvil being thereafter movable into a box end, and a ram movable to press the flaps at a box end against said anvil for effecting firm adherence of the several flaps to each other.

2. In a machine as set forth in claim 1, means for mounting and reciprocating said anvil in a vertical plane and means for mounting and reciprocating said ram in a horizontal plane.

3. In a machine as set forth in claim 1, said movable member comprising a horizontal plate and said frame comprising a horizontal support means on which said plate is slidable, a lead screw nut depending from said plate and a lead screw carried by said frame and engaging said nut, and means for rotating said lead screw to reciprocate said plate.

4. In a machine as set forth in claim 1, said glue device comprising roller means and a glue pan therebelow, means for mounting said glue pan so as to effect movement thereof upwardly toward said roller to immerse said roller and downwardly away from said roller for cleaning thereof and for removal of said glue pan from said machine.

5. In a machine as set forth in claim 1, including means for adjusting said guide shelf comprising a pair of parallel screws supporting said guide shelf, nut means carried by said frame having threaded coaction with said screws, and means for simultaneously rotating said screws to raise or lower said guide shelf.

6. In a machine as set forth in claim 1, means for securing said anvil comprising a plunger, a power means for raising and lowering said plunger, stationary limit stop means adjacent said plunger, limit stop means carried by said plunger to abut said stationary limit stop means to limit downward and upward movement of said anvil.

7. In a machine as set forth in claim 1, a reciprocal plunger and means for securing said anvil to said plunger, power means for effecting reciprocation of said plunger, a fixed guide bracket through which said plunger moves, said guide bracket having a slot closed at its top by a cushion member, a pin carried by said plunger engageable with said cushion member to limit upward movement of said plunger, a stop member carried by said fixed guide bracket and means for effecting adjustable positioning of said stop member thereon in the direction of reciprocation of said plunger, and said stop member having cushion means, and means carried by said plunger for engaging said cushion means to limit downward movement of said plunger.

8. In a machine as set forth in claim 1, power means for effecting reciprocation of said anvil and ram, and circuitry means for controlling said power means comprising a switch positioned adjacent an end of said guide shelf and engageable with a box moving on said guide shelf over said anvil, said switch being operative to initiate upward movement of said anvil into a box end, and another switch disposed in the path of upward movement of said anvil and means carried by said anvil to engage said other switch operative to initiate movement of said rams toward said anvil.

9. In a machine of the class described, a folding horn for folding end flaps and tuck-in flaps foldably joined to end flaps, comprising a member having a substantially flat first surface at one end and a transition of the said surface into a second surface having a curvature at the other end, said first surface having a relatively straight edge merging into a relatively curved edge of said second surface, and means for mounting said folding horn at an angle to the path of movement of boxes so as to abut an end flap at said straight edge and fold said end flap down and subsequently abut a tuck-in flap along said curved edge and subsequently on said curved surface to effect folding of said tuck-in flap, said means for mounting said horn comprising a support member, said folding horn having means securable to said support member in a plurality of selectively rotative fixed positions and means for securing said support member in selective angular positions in two planes relative to said path of movement of boxes and in selective vertical positions with respect to said path of movement.

10. In a machine of the class described, a guide shelf on which boxes may be slid toward an anvil for folding the flaps thereof, where said flaps comprise an end flap foldably joined to a main panel and said end flap having a tuck-in flap foldably joined thereto, a folding horn upstream of said anvil and having a relatively straight edge engageable by said end flap to initiate folding of said end flap downwardly and having a curved surface subsequently engaged by said flap and tuck-in flap to subsequently fold said tuck-in flap toward a plane generally parallel to said main panel, said anvil having a cutaway corner and means for moving said anvil to a stationary position below said guide shelf, wherein a leading edge of said tuck-in flap engages said corner as said box is slid from said shelf over said anvil, said corner being operative to avoid snagging of said leading edge by said anvil.

11. In a machine as set forth in claim 10, including a ram and means for actuating said ram to press said box end against said anvil when said box end has been telescoped on said anvil, and a hood element carried by said ram and disposed to overlay said box end to hold said box end in position on said anvil as said ram approaches said anvil.

12. In a machine as set forth in claim 10, including a ram and means for actuating said ram to press a box end against a front face of said anvil, said cutaway corner being an upstream corner of said anvil and disposed at a rear face thereof.

13. In a machine, as set forth in claim 1, said guide shelf having an extension disposed adjacent said anvil for support of boxes moving into register thereover.

References Cited

UNITED STATES PATENTS

| | | | |
|---|---|---|---|
| 2,270,264 | 1/1942 | Carruth | 53—376 X |
| 2,561,485 | 7/1951 | Sillars | 93—36.3 X |
| 2,633,063 | 3/1953 | Ohrn | 93—49 |
| 2,727,443 | 12/1955 | Watson | 93—49 X |
| 2,774,285 | 12/1956 | Claff et al. | 93—36.3 |
| 2,877,610 | 3/1959 | Atkinson | 53—376 X |

WILLIAM W. DYER, Jr., *Primary Examiner.*

JAMES M. MEISTER, *Examiner.*